(No Model.)

J. H. TURNER.
FEED WATER HEATER.

No. 255,475. Patented Mar. 28, 1882.

WITNESSES
INVENTOR

UNITED STATES PATENT OFFICE.

JOHN H. TURNER, OF FORT WAYNE, INDIANA.

FEED-WATER HEATER.

SPECIFICATION forming part of Letters Patent No. 255,475, dated March 28, 1882.

Application filed December 22, 1881. (No model.)

*To all whom it may concern:*

Be it known that I, JOHN H. TURNER, of Fort Wayne, in the county of Allen and State of Indiana, have invented certain new and useful Improvements in Feed-Water Heaters; and I do hereby declare that the following is a full, clear, and exact description of the invention, which will enable others skilled in the art to which it appertains to make and use the same, reference being had to the accompanying drawings, which form a part of this specification.

Figure 1:
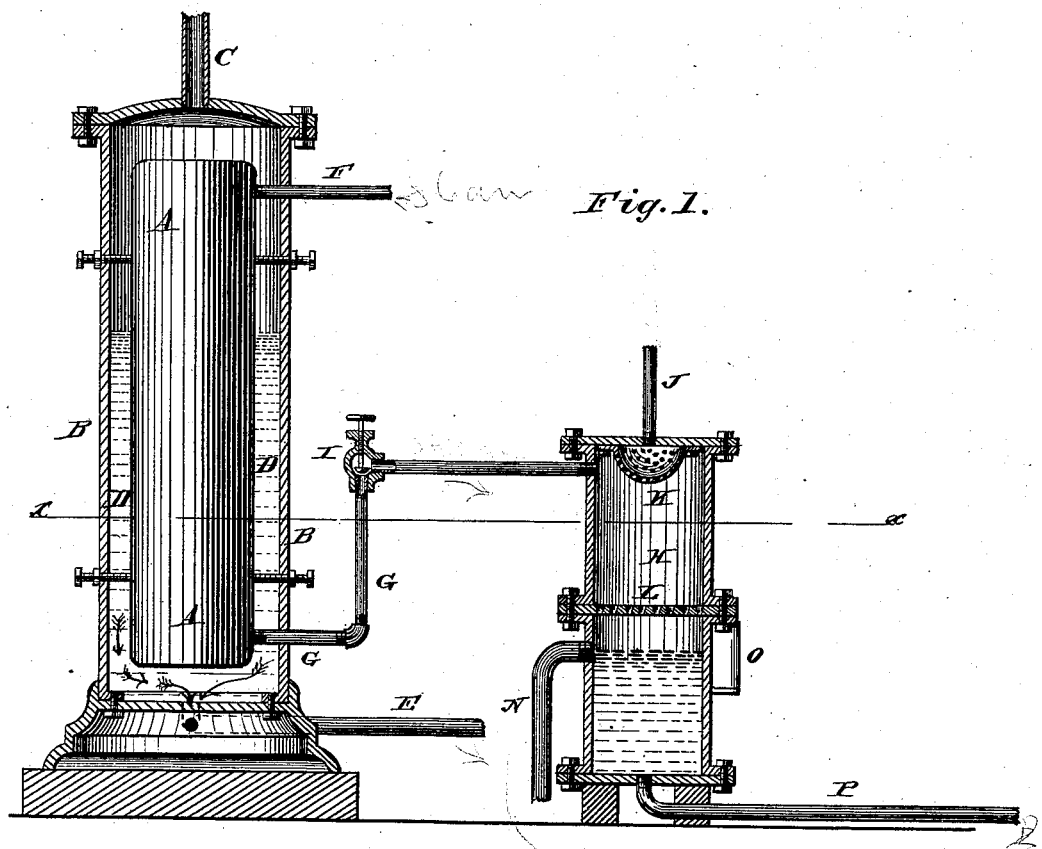
Figure 2:
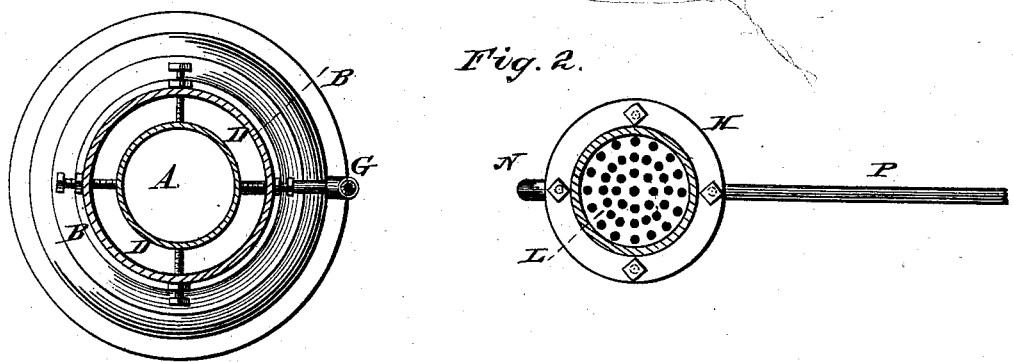

Figure 1 is a vertical sectional view; and Fig. 2 is a horizontal sectional view on the line $xx$, Fig. 1.

Similar letters of reference indicate corresponding parts in both figures.

This invention relates to feed-water condensers for steam-engines; and it consists in certain improvements in the construction of the same, which will be hereinafter fully described, and particularly pointed out in the claim.

In the drawings hereto annexed, A represents a cylindrical or other suitably-shaped shell or tank inclosed within a shell or casing, B. Through a pipe, C, connected to casing B at or near its upper end, water is admitted into the space D, between the two shells A and B, from which it may be taken through a pipe, E, connected to casing B near its lower end, and conveyed to the boilers. A pipe, F, extending through shell B and space D, and connected to tank A near the upper end of the latter, conveys the waste-steam from the engine into said tank, where it is cooled by the feed-water in the surrounding space, which is thus at the same time heated. The steam leaves tank A through a pipe, G, connected near its lower end, and passing through space D and shell B to the condensing cylinder or chamber H. Pipe G is provided with an angle-valve, I, to regulate the flow or passage of steam.

To the upper end of the condensing-chamber is connected a pipe, J, under the opening of which is arranged a conical or concavo-convex finely-perforated plate, K, through which cold water entering through pipe J is discharged as a fine spray into the condensing-chamber, whereby this means the waste-steam is condensed and passes through a diaphragm, L, having tapering or V-shaped perforations M, into the lower part of chamber or cylinder H.

N is an overflow-pipe, arranged to carry off the excess of water, scum, and impurities from the chamber H.

O is a gage or water-glass, suitably arranged for the purpose of enabling the attendant to ascertain the state of the contents of chamber H.

P is a pipe, connected to chamber H near its lower end, the other end of pipe P being connected to the feed-pump.

From the foregoing description, taken in connection with the drawings hereto annexed, the operation and advantages of my invention will be readily understood. It is simple, inexpensive, and effective for the purpose for which it is intended.

Having thus described my invention, I claim and desire to secure by Letters Patent of the United States—

As an improvement in feed-water heaters and condensers, the combination of the cylindrical tank A, surrounding shell B, the pipes C E F G, the condensing-tank H, having spray-plate K, and diaphragm L, provided with V-shaped perforations, the overflow-pipe N, and pipe P, all constructed and arranged substantially as set forth.

In testimony that I claim the foregoing as my own I have hereto affixed my signature in presence of two witnesses.

JOHN H. TURNER.

Witnesses:
FRANK ITEN,
DANIEL MCKENDRY.